United States Patent
Miziolek et al.

(10) Patent No.: US 12,488,165 B2
(45) Date of Patent: Dec. 2, 2025

(54) SIMULATING ADAPTIVE EXPERIMENTS FOR FEASIBILITY ANALYSIS

(71) Applicant: Maplebear Inc., San Francisco, CA (US)

(72) Inventors: Konrad Gustav Miziolek, San Francisco, CA (US); Jacob Jensen, Metuchen, NJ (US)

(73) Assignee: Maplebear Inc., San Francisco, CA (US)

( * ) Notice: Subject to any disclaimer, the term of this patent is extended or adjusted under 35 U.S.C. 154(b) by 695 days.

(21) Appl. No.: 17/955,468

(22) Filed: Sep. 28, 2022

(65) Prior Publication Data
US 2024/0104271 A1 Mar. 28, 2024

(51) Int. Cl.
*G06F 30/27* (2020.01)
*G06F 11/34* (2006.01)
*G06F 30/20* (2020.01)
*G06F 111/08* (2020.01)
*G06N 7/01* (2023.01)
*G06Q 30/0201* (2023.01)
*G06Q 30/0242* (2023.01)
*G06V 10/74* (2022.01)

(52) U.S. Cl.
CPC .......... *G06F 30/27* (2020.01); *G06N 7/01* (2023.01); *G06F 11/3457* (2013.01); *G06F 30/20* (2020.01); *G06F 2111/08* (2020.01); *G06Q 30/0201* (2013.01); *G06Q 30/0243* (2013.01); *G06V 10/761* (2022.01)

(58) Field of Classification Search
CPC ...... G06F 30/27; G06F 2111/08; G06F 30/20; G06F 11/3457; G06N 7/01; G06V 10/761; G06Q 30/0201; G06Q 30/0243
See application file for complete search history.

(56) References Cited

U.S. PATENT DOCUMENTS

| | | | |
|---|---|---|---|
| 2021/0089438 A1* | 3/2021 | Gardner | G06F 11/3688 |
| 2022/0043742 A1* | 2/2022 | van Adelsberg | G06F 11/3698 |
| 2023/0281347 A1* | 9/2023 | Jones | G06F 30/20 703/2 |

OTHER PUBLICATIONS

Mittal et al., NPL ("Simulation-based Complex Adaptive Systems" Published 2017 Total 23 Pages (Year: 2017).*

* cited by examiner

*Primary Examiner* — Quoc A Tran
(74) *Attorney, Agent, or Firm* — Fenwick & West LLP

(57) ABSTRACT

A variation testing system environment for simulating adaptive experiments of objects is disclosed. An experiment system conducts one or more simulations of an adaptive experiment that includes a plurality of variants of an object. Simulation results based on the one or more simulations are generated that are indicative of at least an estimated amount of time to conduct a real-world adaptive experiment based on the one or more simulations.

20 Claims, 12 Drawing Sheets

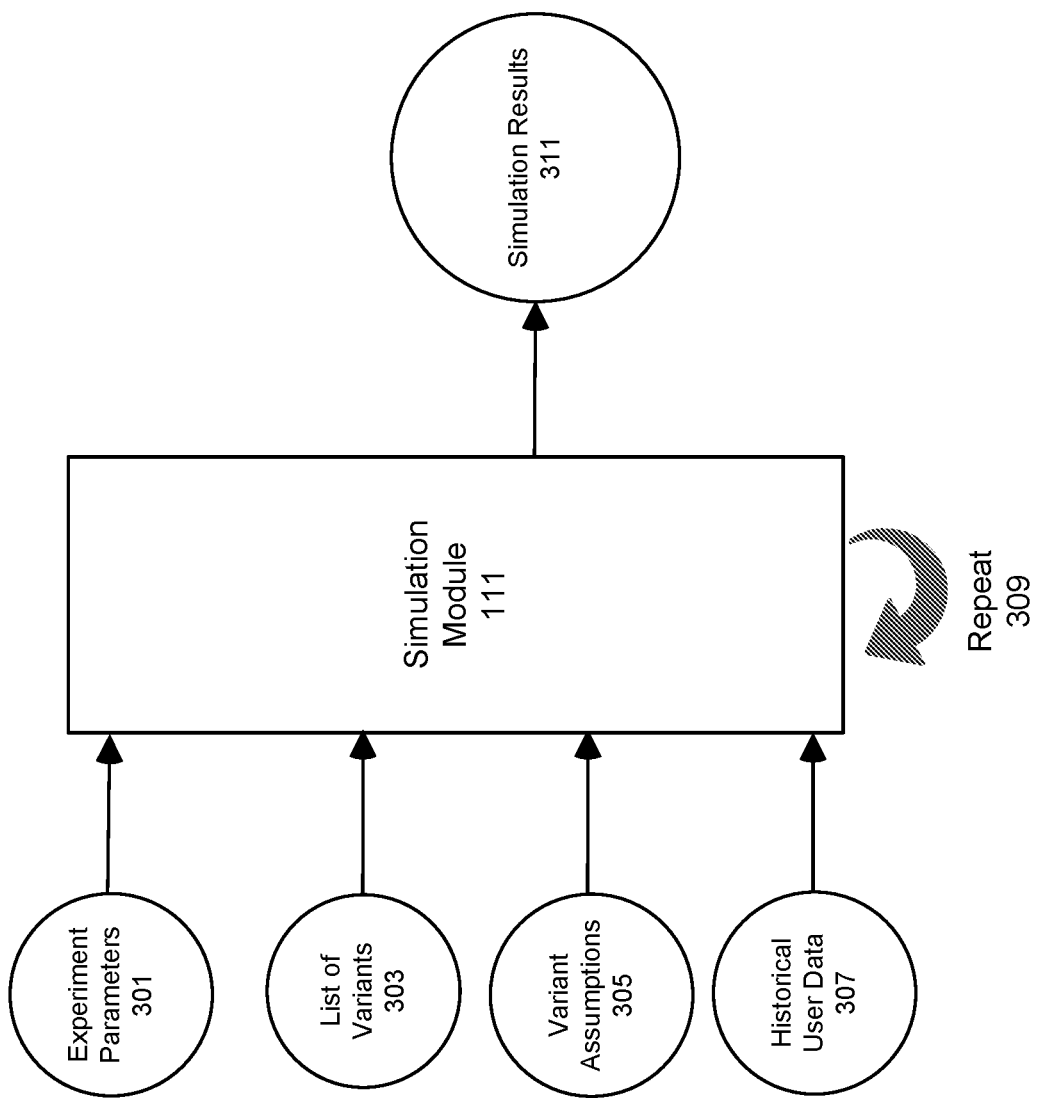

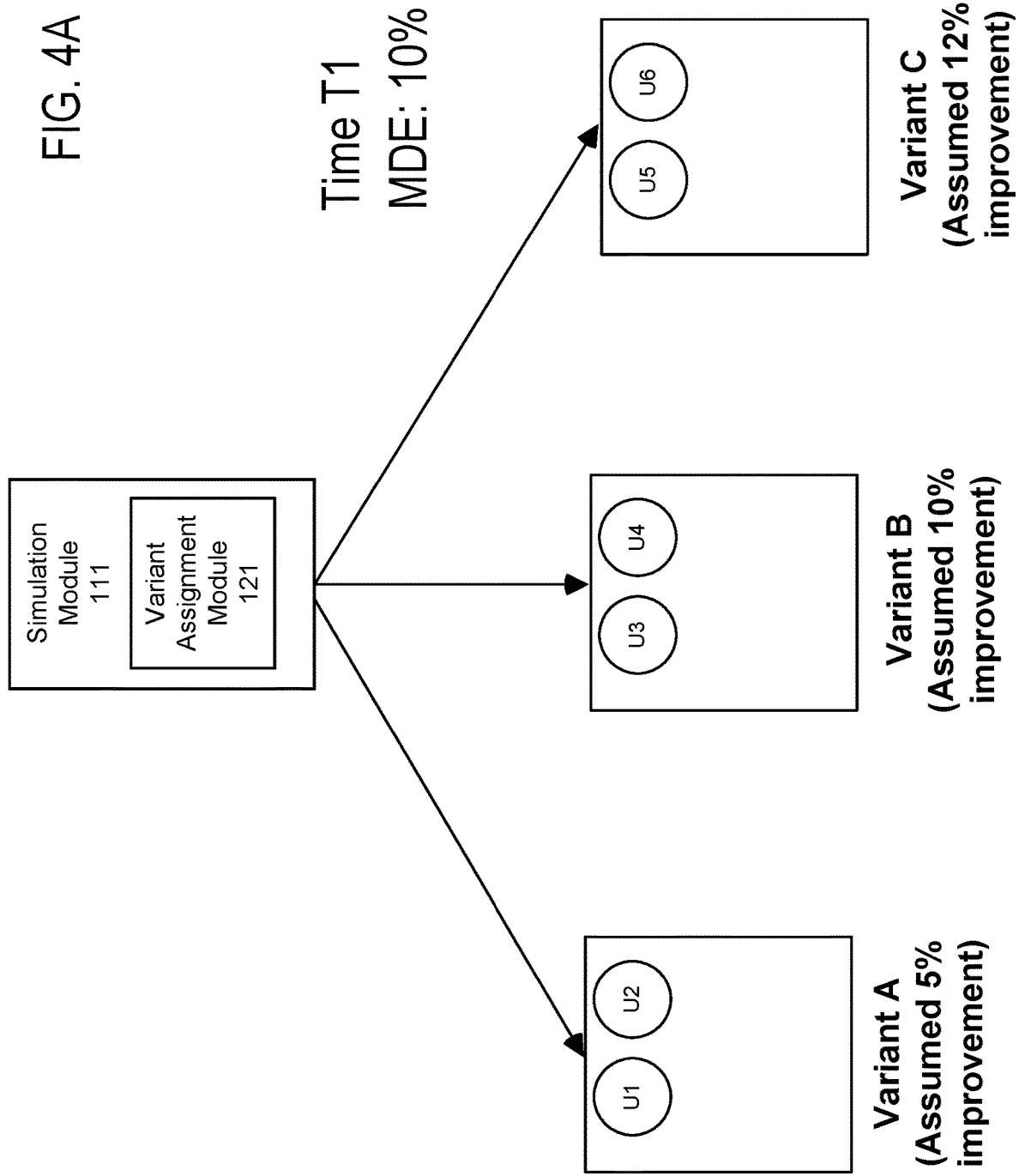

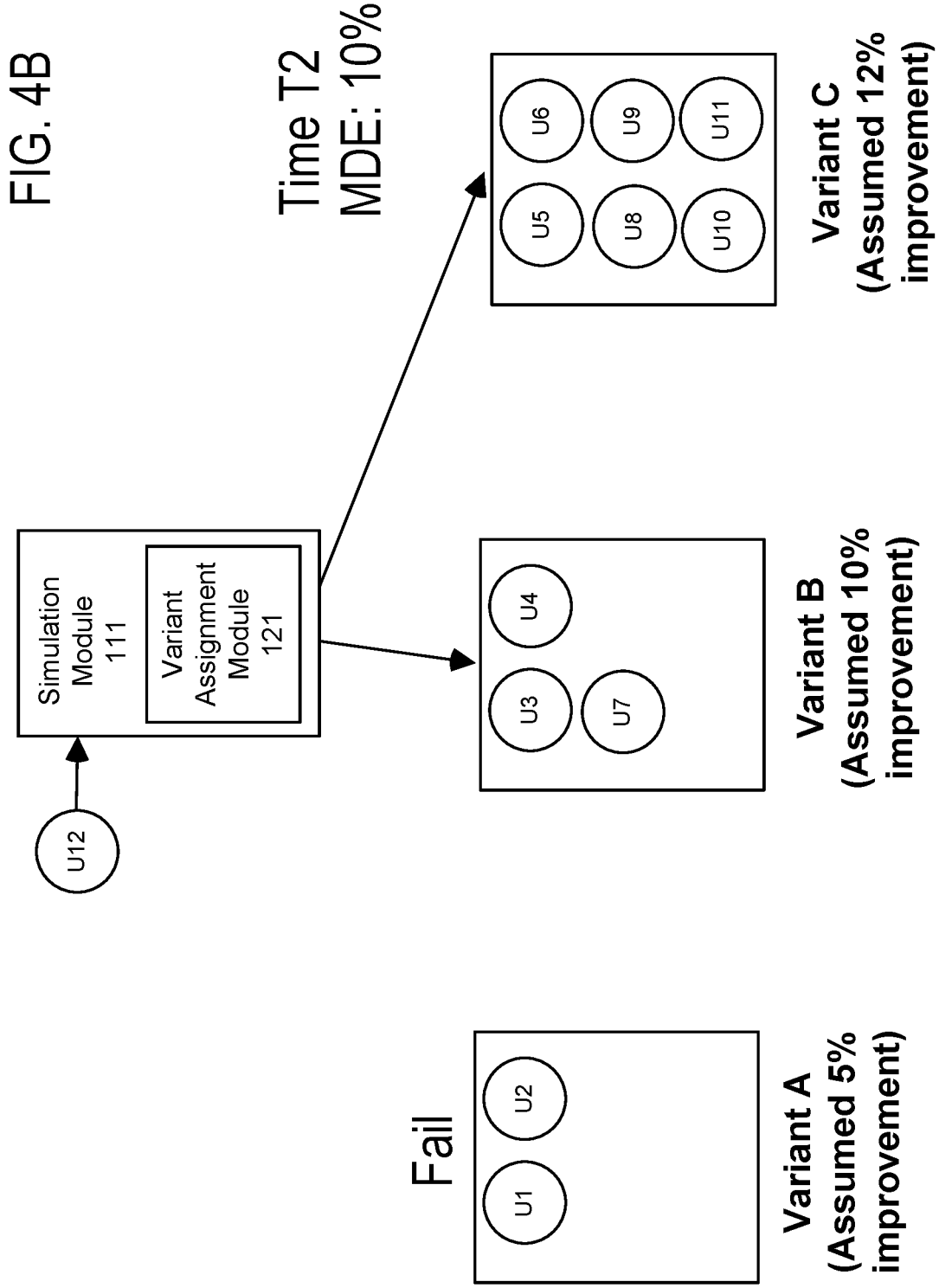

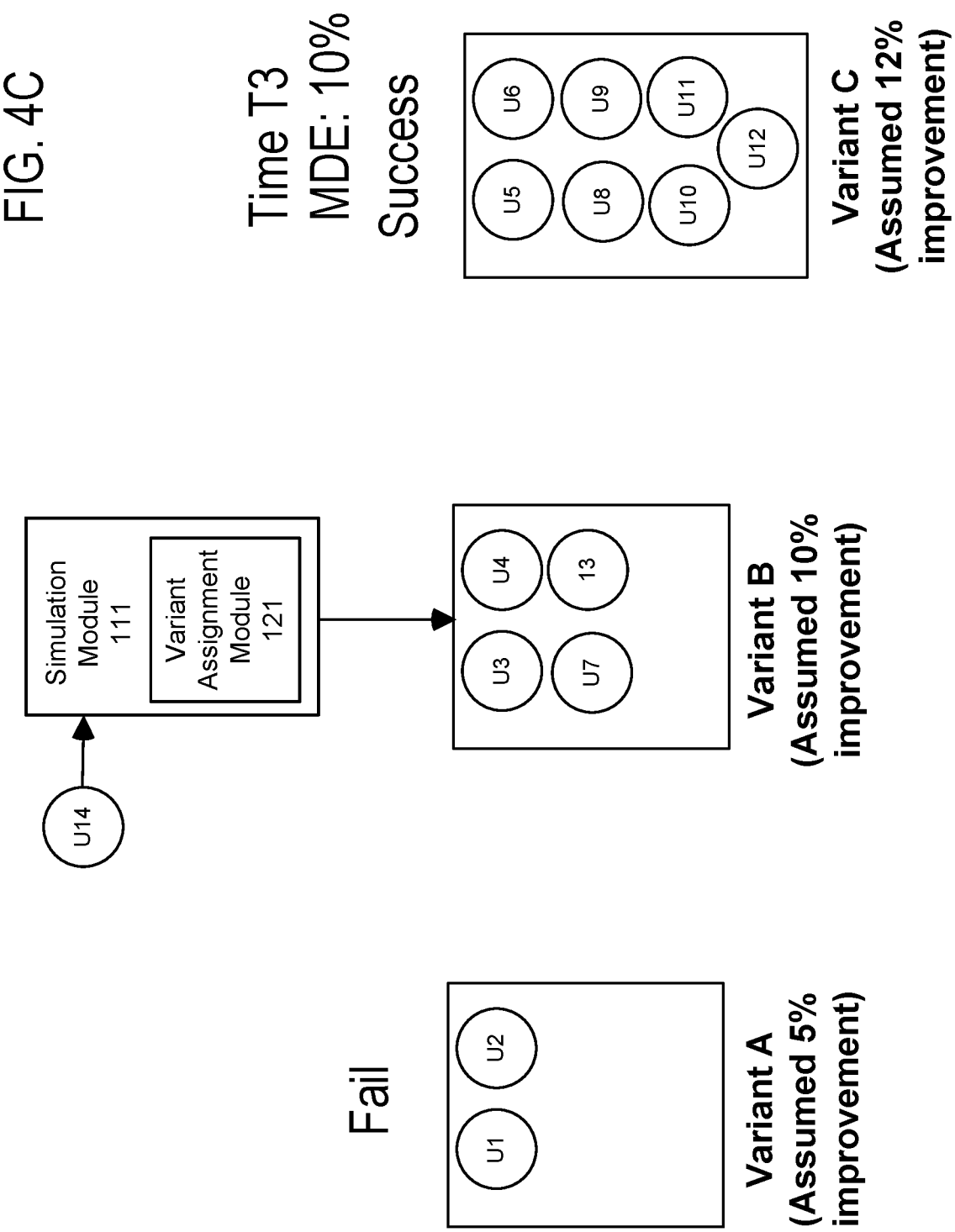

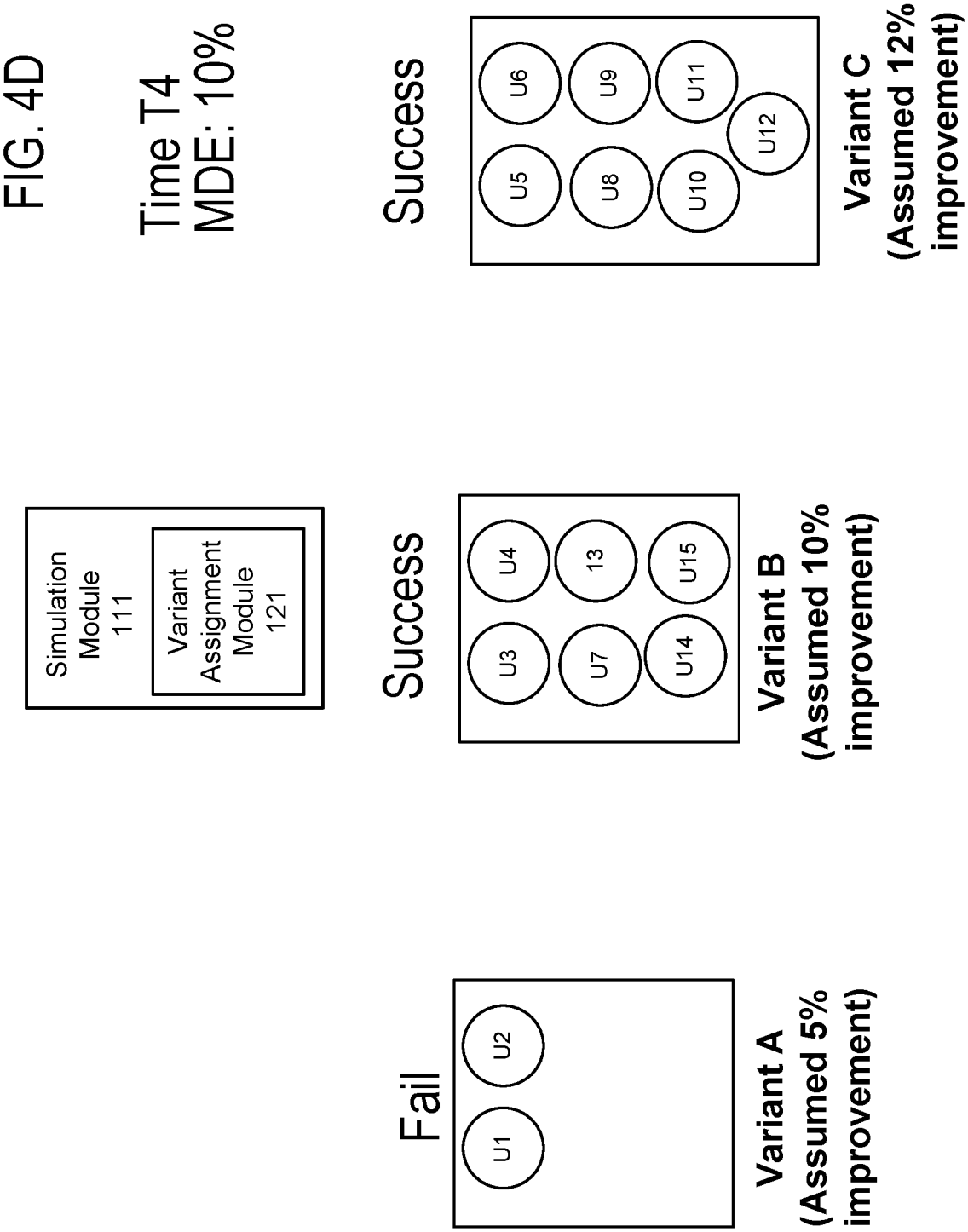

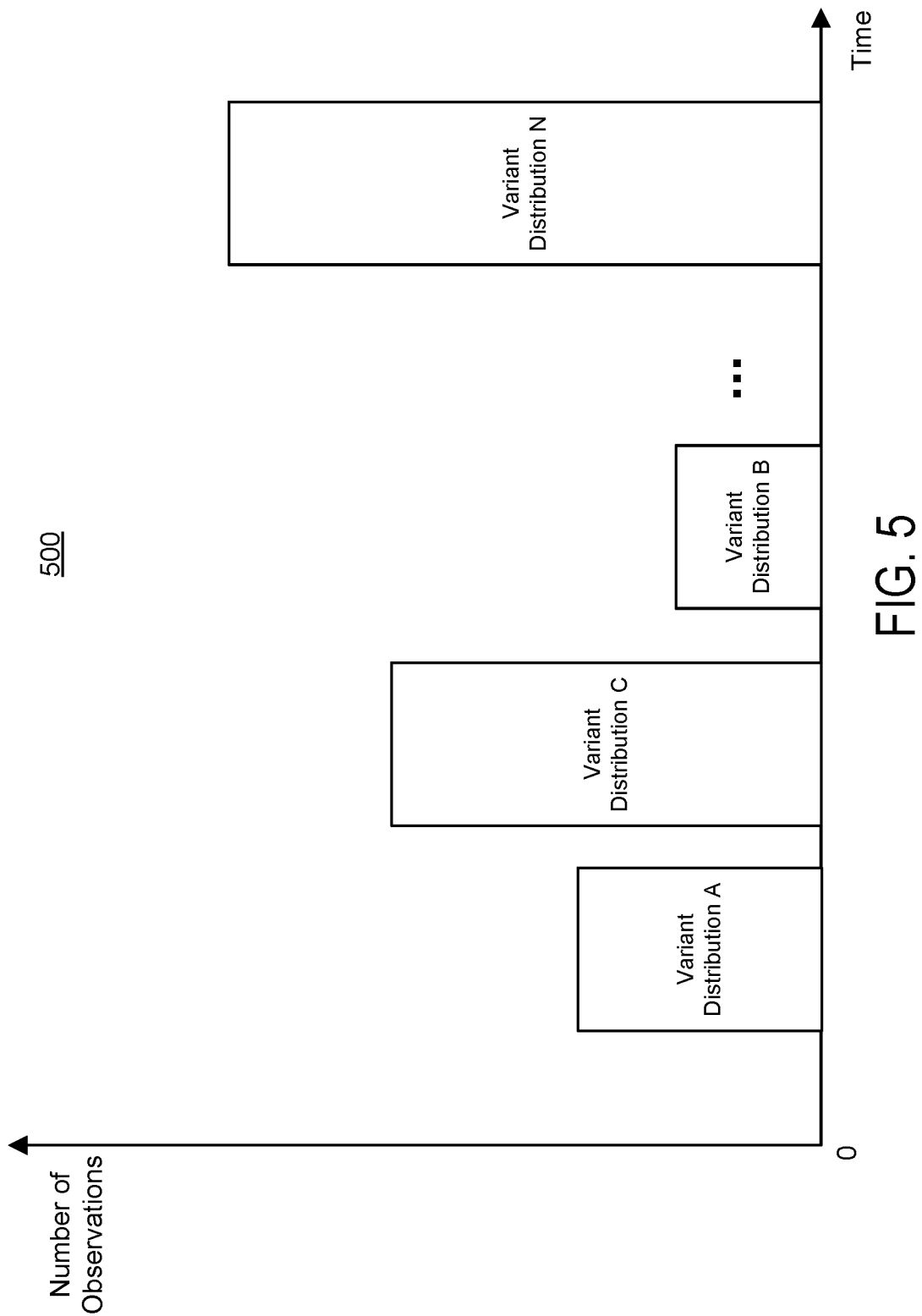

SIMULATING ADAPTIVE EXPERIMENTS FOR FEASIBILITY ANALYSIS

BACKGROUND

The embodiments described herein pertain in general to conducting adaptive experiments and more particularly to simulating adaptive experiments.

Object variation testing is an experiment that tests changes to an object against other variants of the object. A/B experiments are one type of experiment that is performed on variants of an object to determine performance of the different variants. However, the number of variants that can be included in an A/B experiment is limited. Thus, A/B experiments cannot be used when the number of variants to include in an experiment is large, as considerable time would be required to conduct a multitude of A/B experiments for all of the variants.

Adaptive experimentation is another type of experiment that can be performed on variants of an object to determine performance of the different variants. Generally, adaptive experiments allow experimentation on more variants compared to A/B experiments. In adaptive experiments, the proportion of assignments to the different variants of the experiment are not fixed like in an A/B experiment, but instead varies based on observed results during the adaptive experiment. This results in adaptive experiments being conducted for an undetermined amount of time to reach a conclusion of the adaptive experiment which is undesirable. As a result, it is unclear how long an adaptive experiment may take to conclude and how many variants can be included in the adaptive experiment.

BRIEF SUMMARY

The embodiments herein describe a variation testing system environment for simulating adaptive experiments of objects. An experiment system conducts one or more simulations of an adaptive experiment that includes a plurality of variants of an object. Simulation results based on the one or more simulations are generated that are indicative of at least an estimated amount of time to conduct a real-world adaptive experiment that is based on the simulated adaptive experiment. A real-world experiment can then be designed and conducted based on the simulation results.

Features and advantages described in this summary and the following detailed description are not all-inclusive. Many additional features and advantages will be apparent in view of the drawings, specification, and claims hereof.

BRIEF DESCRIPTION OF THE DRAWINGS

FIG. 3 is a high-level diagram describing a simulated adaptive experiment conducted by a simulation module according to one or more embodiments.

FIGS. 4A to 4D are diagrams illustrating a detailed view of the simulated adaptive experiment according to one or more embodiments.

FIG. 5 is a histogram of simulation results of a plurality of simulated adaptive experiments including the plurality of variants according to one or more embodiments.

DETAILED DESCRIPTION

Figure 1:
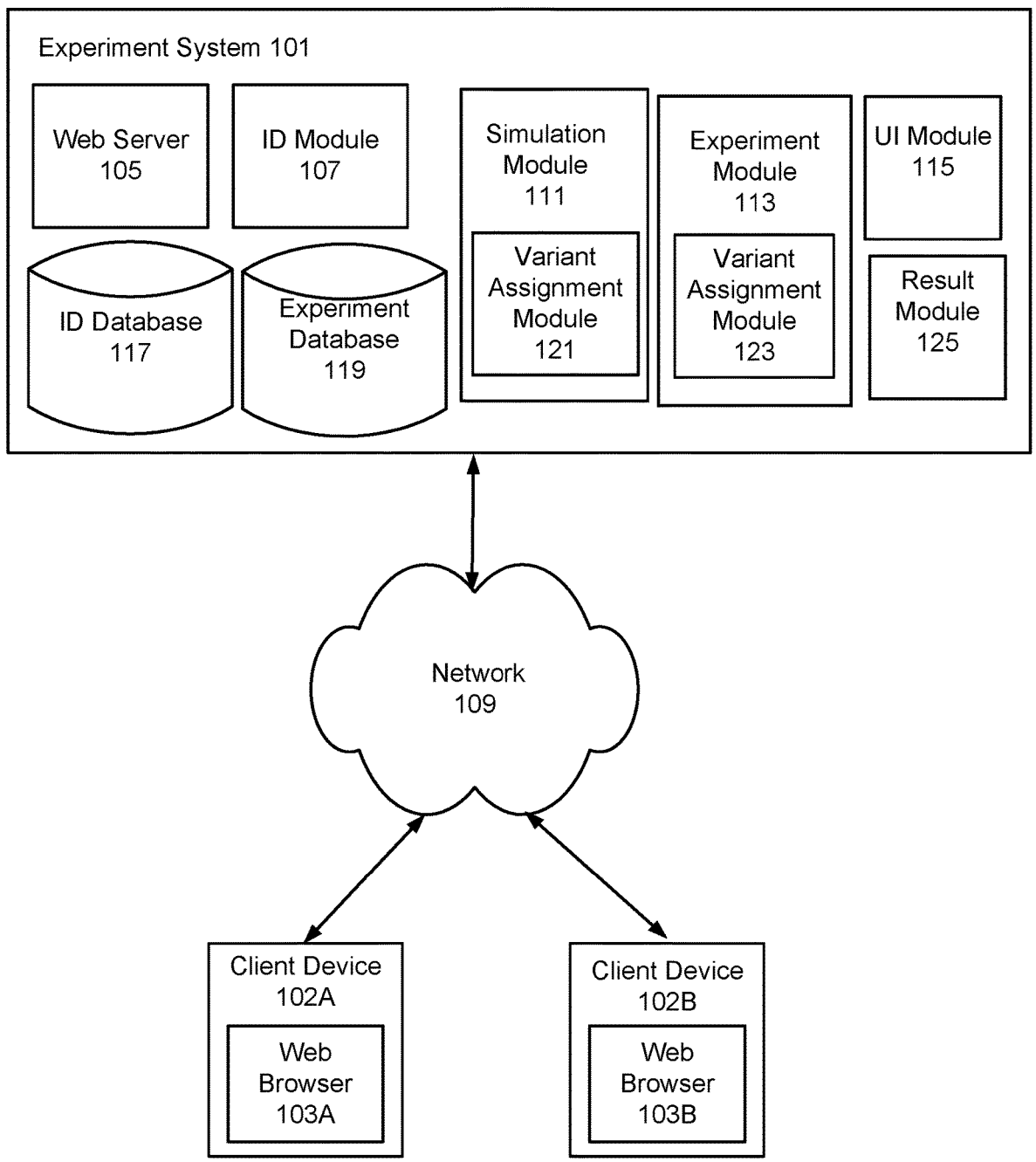
FIG. 1 is a block diagram of a variant testing system environment according to one or more embodiments.

FIG. 1 is a block diagram of a variant testing system environment 100 according to one or more embodiments. Environment 100 includes client devices 102 (e.g., client device 102A and client device 102B). In one or more embodiments, client device 102A is a device of a first user and client device 102B is a device of a second user. Client device 102A may represent one or more devices of the first user and client device 102B may represent one or more devices of the second user. Client devices 102 are connected to an experiment system 101 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one or more embodiments, network 109 is the Internet and uses standard communications technologies and/or protocols. Thus, network 109 can include links using technologies such as Ethernet, 802.11 (WiFi), worldwide interoperability for microwave access (WiMAX), 3G, 4G, 5G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one or more embodiments, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the experiment system 101 via the network 109 to receive objects from the experiment system 101. In one or more embodiments, each client device 102 is a computer system capable of communicating with the experiment system 101. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the content provider 101. Suitable web browsers include, but are not limited to, GOOGLE CHROME, MICROSOFT INTERNET EXPLORER, MICROSOFT EDGE, MOZILLA FIREFOX, and APPLE SAFARI.

In one or more embodiments, the experiment system 101 may be an individual, a group of individuals, or an entity such as a company. The experiment system 101 provides objects to client devices 102. The experiment system 101 may be considered a content provider. While only one experiment system 101 is shown, it is understood that any number of experiment systems are supported and can be in the environment 100 at any time.

In one or more embodiments, the objects provided by the content provider 101 include web pages. However, the experiment system 101 may provide different types of objects than web pages. Any type of object can be experimented on by the experiment system 101 as long as different variations of the object can be created.

In another example, an object can be a program to which different users apply for acceptance. Different variations of the program can each include different incentives that entice users to join the program. Other types of objects include video, audio, a combination of video and audio, still images (e.g., JPEG), text documents, advertisements, and/or any other types of objects. For purposes of convenience and the description of one or more embodiments, the example of objects provided by the experiment system 101 are web pages, but no limitation on the type of objects are intended by this terminology.

In one or more embodiments, the experiment system 101 performs experimentation on objects. The experiment system 101 may provide different variants of an object to client devices 102 according to an adaptive experiment (e.g., a variation test) being performed on the object. An adaptive experiment for an object tests changes to one or more features of the object included in multiple variants of the object (e.g., the current version or control of the object and different variants of the object) to determine whether the changes to the one or more features produce a desired result in a performance metric (e.g., treatment) under evaluation. An example of a performance metric under evaluation when the object is a web page is increased conversions (e.g., purchases) of a product advertised on the web page resulting from a change to a feature of the web page. While conversions are one type of performance metric that may be monitored during an adaptive experiment, the experiment may be targeted towards any type of performance metric. Thus, adaptive experiments on different variants of objects provided by the experiment system 101 validates a new design of the object or changes to features of the object before the new design or changes are put into production by the experiment system 101 such as during a release of the public to all users of the experiment system 101.

Figure 2A:
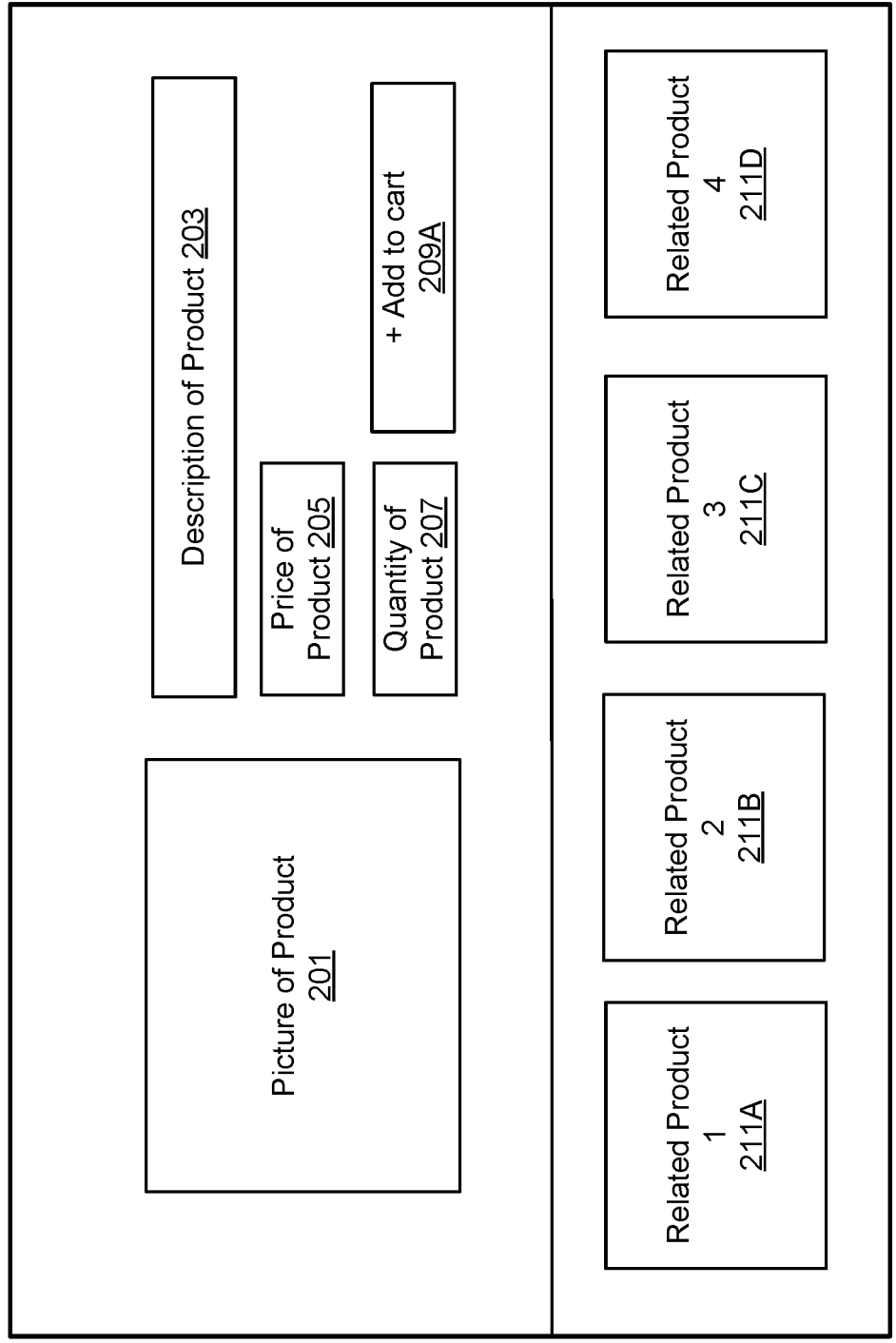
FIGS. 2A to 2C are example variants of an object according to one or more embodiments.
Figure 2B:
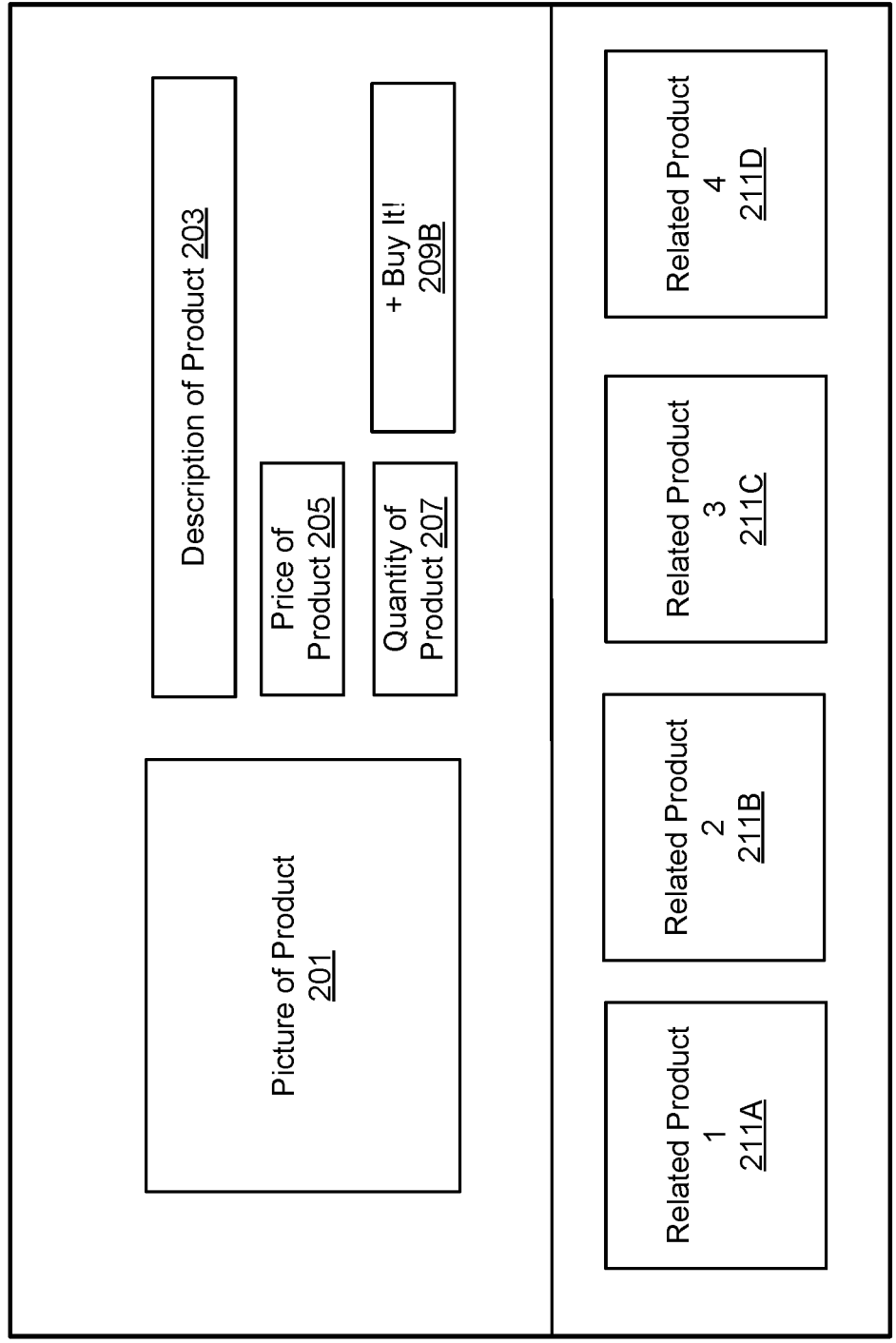
Figure 2C:
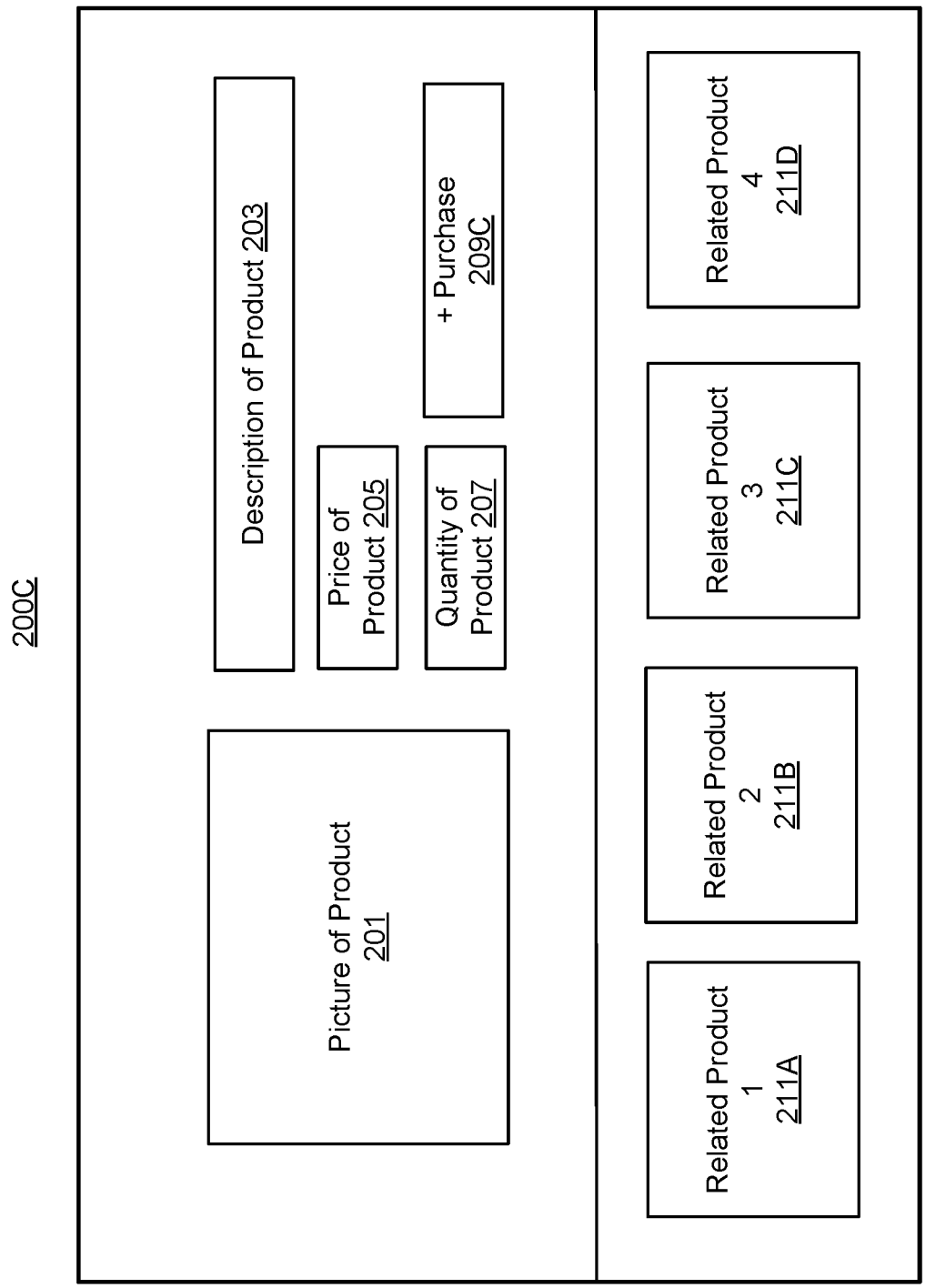

For a given object, the experiment system 101 may store one or more variants of the object that are used in an adaptive experiment for the object. In an example where the object is a web page, an adaptive experiment of a web page tests a plurality of variants of the webpage including an "A" variant, a "B" variant, and a "C" variant as shown in FIGS. 2A to 2C. FIG. 2A is an example of the "A" variant of a web page 200A provided by experiment system 101. The "A" variant of the web page 200A includes a plurality of features including a picture of a product 201 being sold on the web page 200A, a description of the product 203, a price 205 of the product, a quantity 207 of the product for purchase, a purchase mechanism 209A, and a plurality of related products 211A to 211D. Any of the features included in the web page 200A may be changed in one or more variants during an adaptive experiment. In the example described herein, the adaptive experiment performed on the web page 200 tests different purchase mechanisms 209 to see which is an improved user interface layout. The user interface layout of the web page may be improved in that the layout is optimized to increase conversions of the product on the web page 200. In the "A" variant shown in FIG. 2A, the purchase mechanism 209A includes the label "+Add to cart".

FIG. 2B is an example of a "B" variant of a web page 200B. Web page 200B includes a change (i.e., a modification) to the feature being evaluated. As mentioned above, the purchase mechanism 209 is under evaluation while all other features of the web page remain consistent across the different versions of the web page 200. For example, the picture of the product 201 being sold on the web page 200A, the description of the product 203, the price 205 of the product, the quantity 207 of the product for purchase, and the plurality of related products 211A to 211D are the same across web page 200A to web page 200C shown in FIGS. 2A to 2C. However, the purchase mechanism 209 is different across the different versions of the web page 200. In FIG. 2B, the purchase mechanism 209B includes the label "+Buy It!" rather than the label "+Add to cart" in FIG. 2A.

FIG. 2C is an example of a "C" variant of a web page 200C. Web page 200C includes yet another change (i.e., a modification) to the purchase mechanism 209 while the remaining features of the web page 200C are the same as in web pages 200A and 200B. In web page 200C shown in FIG. 2C, the purchase mechanism 209B includes the label "+Purchase". In example shown in FIGS. 2A to 2C, the experiment determines which of the labels for the purchase mechanism 209 result in a higher rate of purchase conversions of the product advertised on the web page 200. The variant with the highest rate of purchase conversions may be declared the "winner" of the experiment by the content provider 101.

For ease of discussion, the embodiments discussed herein describe a web page having only three variants: "A" variant, "B" variant, and "C" variant. However, an adaptive experiment may include any number of variants of an object (e.g., hundreds of variants). Due to the number of variants that may be included in an adaptive experiment, and the nature of how adaptive experiments are conducted, it is difficult to know how many of the variants to include in a real-world adaptive experiment and how long it will take for the real-world adaptive experiment to conclude. Because the assignment proportion is not fixed in an adaptive experiment, the sample size each variant will receive over a given period of time is unknown. Thus, an estimation of a duration of time it will take to conclude cannot be determined.

In one or more embodiments, the experiment system 101 conducts simulations of adaptive experiments that include a multitude of different variants. By conducting a simulation of an adaptive experiment having multiple variants, the experiment system 101 determines from the simulation how many variants can be included in a real-world adaptive experiment (e.g., not a simulated adaptive experiment) and an estimated length of time required to conduct the real-world adaptive experiment. Thus, a real-world adaptive experiment may be optimized based on the simulation of the adaptive experiment before the real-world adaptive experiment is conducted.

Referring back to FIG. 1, in one or more embodiments the experiment system 101 includes a web server 105, an identification (ID) module 107, a simulation module 111, an experiment module 113, user interface (UI) module 115, a result module 125, an ID database 117, and an experiment database 119. As is known in the art, the term "module" refers to computer program logic utilized to provide the specified functionality. Thus, a module can be implemented in hardware, firmware, and/or software. In one or more embodiments, program modules are stored on a non-transitory storage device (i.e., a computer program product), loaded into a memory, and executed by one or more computer processors. Additionally, other embodiments of the experiment system 101 shown in FIG. 1 can have different and/or other modules than the ones described here, and that the functionalities can be distributed among the modules in a different manner.

The experiment database 119 stores multiple (i.e., a plurality of) experiment records that describe simulated adaptive experiments conducted by the experiment system 101 as well as experiment records that describe real-world adaptive experiments conducted by the experiment system 101. In one or more embodiments, each experiment record for a simulated adaptive experiment includes an experiment identifier (e.g., numeric identifier or alphanumeric identifier) unique to the simulated adaptive experiment, a definition of the simulated adaptive experiment, and a definition of success for the simulated adaptive experiment.

In one or more embodiments, the definition of the simulated adaptive experiment describes a plurality of parameters of the simulated adaptive experiment and a list of variants that are included in the simulated adaptive experiment. The parameters of the simulated adaptive experiment may include a likelihood ($\alpha$) of a false positive during the simulated adaptive experiment, a likelihood of a false negative ($\beta$) during the simulated adaptive experiment, and a minimum detectable effect (MDE) of a given performance metric as being statistically significantly different from 0.

In one or more embodiments, the MDE of the simulated adaptive experiment may include upper and lower bounds. For example, a MDE of the simulated adaptive experiment may be a specified improvement (e.g., 10%) over the control of an object with an upper bound (e.g., +3%) and a lower bound (e.g., −3%). In an example where the object is a web page, the performance metric being measured may be a conversion rate such as a purchase of a product shown on the web page. In an example where the object is a program, the performance metric being measured is conversion rate of user sign up of the program. The parameters of the simulated adaptive experiment may include other parameters than described herein.

In one or more embodiments, the list of variants specified in the definition of the simulated adaptive experiment include identifiers (e.g., numeric identifier or alphanumeric identifier) of different variants of the object included in the simulated adaptive experiment. The definition of the simulated adaptive experiment may also include for each variant at least one variant assumption for the variant included in the simulated adaptive experiment.

In one or more embodiments, a variant assumption for a given variant of an object describes an assumed performance of the variant with respect to a control of the object. For example, the assumed performance for each variant may describe how much better or worse the variant may perform in comparison to the control of the object. The assumed performance may be a mean performance metric for example. As an example, the "A" variant of the web page shown in FIG. 2A may have an assumed performance of 5% conversion improvement over the control of the web page, the "B" variant of the web page shown in FIG. 2B may have an assumed performance of 10% improvement over the control of the web page, and the "C" variant of the web page shown in FIG. 2C may have an assumed performance of 12% improvement over the control of the web page, for example. In one or more embodiments, the assumed performance for each variant may also describe an assumed standard deviation with respect to the assumed performance of the variant.

In one or more embodiments, the definition of the simulated adaptive experiment may also specify a total number of simulations to perform in the simulated adaptive experiment and a total number of observations (e.g., samples) for each simulation. The experiment record may optionally include a maximum duration for the simulated adaptive experiment.

In one or more embodiments, a definition for success describes one of a plurality of different outcomes that is indicative of a successful simulated adaptive experiment. In one or more embodiments, an indication of a successful simulated adaptive experiment is an identification of a single best performing variant from amongst the plurality of variants that are included in the simulated adaptive experiment. In one or more embodiments, an indication of a successful simulated adaptive experiment is an identification of one or more variants from amongst the plurality of variants that have a performance that is better than a performance of the control of the object. In one or more embodiments, an indication of a successful simulated adaptive experiment is an identification of one or more variants from amongst the plurality of variants that have a performance that is better than the MDE of the simulated adaptive experiment.

In one or more embodiments, experiment records that describe real-world adaptive experiments conducted by the experiment system 101 include similar attributes described above for the simulated adaptive experiment. For example, an experiment record for a real-world adaptive experiment conducted by the experiment system 101 includes an experiment identifier (e.g., numeric identifier or alphanumeric identifier) unique to the real-world adaptive experiment, a definition of the real-world adaptive experiment, and a definition of success for the real-world adaptive experiment.

In one or more embodiments, the web server 105 links the experiment system 101 to one or more client devices 102 via the network 109. The web server 105 serves objects such as web pages, programs, as well as other web related content to client devices 102. The web server 105 may include a mail server or other messaging functionality for receiving and routing messages between the experiment module 113 and one or more client devices 102.

The ID module 107 generates user identifiers for users of client devices 102. In one or more embodiments, the user identifier is used by the user of a client device 102 to log into a web page or application provided by the experiment system 101. In one or more embodiments, a user identifier is a string of numbers that is unique to a particular client device 102. Thus, client device 102A may have a different user identifier than the user identifier for client device 102B.

In one or more embodiments, the ID module 107 generates a user identifier by automatically incrementing the value of the last user identifier generated by the ID module 107 using an auto increment function. Alternatively, the ID module 107 generates a unique random number and assigns the unique random number as a user identifier for a client device 102. In another embodiment, the ID module 107 may receive a user identifier from a client device 102. The user identifier received from the client device 102 may be generated by the client device 102 or the user identifier may be input by the user into the client device 102. The ID module 107 stores user identifiers in the ID database 117 that maintains a record of all assigned user identifiers.

In one or more embodiments, a record for an assigned user identifier may include information about the associated user if the user has granted the experiment system 101 permission to collect and store the information. The information about the user may be demographic information (e.g., age, sex, geographic location). The information about the user may also include historical user data indicative of prior user requests for objects from the experiment system 101, object interactions associated with the prior user requests (e.g., was a conversion performed), and information related to the requests such as the date, time of date, and location from which the client device 102 of the user transmitted the request.

In one or more embodiments, responsive to the experiment system 101 receiving a request for an object from a client device, the ID module 107 communicates with the client device 102 to determine whether the client device 102 already has a user identifier. For example, the ID module 107 may query the client device 102 to transmit the user identifier via a login form displayed on a web page of the experiment system 101. In another example, the ID module 107 queries the client device 102 to determine whether the client device 102 includes a stored cookie that comprises a user identifier for the client device 102. If the client device 102 lacks a cookie with a user identifier for the client device 102, the ID module 107 may query the client device 102 to transmit the user identifier via a login form displayed on the web page of the experiment system 101. Alternatively, the ID module 107 generates a user identifier for the client device 102 and communicates the user identifier to the client device 102 for storage in a cookie at the client device 102 if the client device 102 lacks a cookie with a user identifier. The client device 102 will continue to use the user identifier generated by the ID module 107 for subsequent requests for the web page.

Adaptive Experiment Simulation

In one or more embodiments, the simulation module 111 is a simulator that simulates adaptive experiments of variants of objects. The simulation module 111 performs a simulation of an adaptive experiment of variants using simulated users rather than perform a real-world adaptive experiment of variants using requests from users of client devices 102. In one or more embodiments, the simulation module 111 conducts the simulation of an adaptive experiment using one or more Monte Carlo simulations. However, other simulation models may be used in other embodiments.

FIG. 3 is a diagram describing a simulated adaptive experiment conducted by the simulation module 111 according to one or more embodiments. In one or more embodiments, the simulation module 111 receives as an input a definition of the simulated adaptive experiment stored in the experiment database. The definition of the simulated adaptive experiment inputted into the simulation module 111 includes the experiment parameters 301 including a likelihood (a) of a false positive during the simulated adaptive experiment, a likelihood of a false negative ((3) during the simulated adaptive experiment, and a MDE of a given performance metric being measured. The inputted definition also includes the list of variants 303 included in the simulated adaptive experiment and the variant assumptions 305 for the variants in the list 303. As described above, the variant assumptions include the assumed performance of each variant in the list 303. The inputted definition may also include the total number of simulations to perform of the simulated adaptive experiment.

The simulation module 111 may also receive historical user data 307 stored in the ID database 117. The simulation module 111 may receive historical user data 307 of users that requested an object from the experiment system 101 within a particular time interval (e.g., the last 3 months). In one or more embodiments, the simulation module 111 generates simulated requests for an object being tested in a simulated adaptive experiment based on the historical user data 307. That is, each user indicated in the historical user data 307 can be used as a simulated user that requested the object being tested in the simulated adaptive experiment performed by the simulation module 111.

In one or more embodiments, the simulation module 111 repeatedly 309 performs a plurality of simulations of the adaptive experiment based on the received inputs. Specifically, the simulation module 111 simulates the behavior of the adaptive experiment based on the experiment parameters and the assumed performance of each variant included in the simulated adaptive experiment. After the last simulation of the adaptive experiment is conducted, the simulation module 111 outputs simulation results 311. The simulation results 311 can be used to design a real-world adaptive experiment as will be further described below.

Generally, the simulation results describe the performance of the simulated adaptive experiment. The simulation results 311 includes an estimated amount of time required to conduct a real-world adaptive experiment having the same parameters as the simulated adaptive experiment. Since the simulation module 111 may repeatedly perform the simulation of the adaptive experiment, the simulation module 111 may include a range or distribution of the estimated amount of time to complete a real-world adaptive experiment that is based on the simulated adaptive experiment. The simulations for the adaptive experiment may include the same variant assumptions 305 for all of the performed simulations.

Alternatively, one or more simulations for the adaptive experiment may include a different distribution of variant assumptions (e.g., variant performance). Thus, a first set of simulations for the variants included in the definition (e.g., the first 5,000 simulations) may have a first assumed performance for each variant whereas a second set of simulations for the variations (e.g., the second 10,000 simulations) may be conducted using a second assumed performance for each variant that is different from the first assumed performance. By performing the simulated adaptive experiment with different variant performances, the simulation results 3111 may include the best and worst case performance scenarios for the variants. Thus, the simulation module 111 may include a range or distribution of the times to complete all of the plurality of simulations of the adaptive experiment in the simulation results. The estimated amount of time may include a first estimated amount of time that is representative of a best case scenario, a second estimated amount of time that is representative of a worst case scenario, and a third estimated amount of time that is representative of an average case scenario.

The simulation results 311 may also indicate a proportion (e.g., a percentage) of simulations in which the variant having the "best" assumed performance from amongst the plurality of variants included in the simulated adaptive experiment is selected by the simulation module 111 for simulated users. That is, the simulation results 311 specifies whether the variant having the highest observed performance during the simulated adaptive experiment is the variant with the highest assumed performance. The simulation results 311 may also include a time series that indicates how the variant weights for the plurality of variants included in the simulated adaptive experiment change over time during the simulated adaptive experiment. The simulation results 311 may also include a time series that indicates the estimated effects of the plurality of variants included in the simulated adaptive experiment over time.

As shown in FIG. 1, the simulation module 111 includes a variation assignment module 121 in one or more embodiments. The variation assignment module 121 assigns (e.g., selects) a variant of an object from the plurality of variants that are included in the simulated adaptive experiment to a simulated user during the simulated adaptive experiment. FIGS. 4A to 4C illustrate a detailed view of the process of conducting the simulated adaptive experiment which includes variation assignment performed by the variant assignment module 121 according to one or more embodiments.

In the example shown in FIGS. 4A to 4C, the simulated adaptive experiment has a hypothesized MDE of 10% improvement over a control of an object and the variants for the simulated adaptive experiment includes an "A" variant of the object having an assumed performance of a 5% improvement over the control, a "B" variant having an assumed performance of a 10% improvement over the control of the object, and a "C" variant having an assumed performance of a 12% improvement over the control. In one example, the simulation module 111 is conducting a simulated adaptive experiment on a web page using three different web page variations (e.g., variant A, variant B, and variant C as shown in FIGS. 2A to 2C).

In one or more embodiments, the variant assignment module 121 may randomly assign simulated users to variants included in the simulated adaptive experiment. The assignment may initially result in an even distribution of simulated users to the different variants included in the simulated adaptive environment. FIG. 4A illustrates that the variant assignment module 121 assigned simulated users to the "A" variant, the "B" variant, and the "C" variant at a time T1. Time T1 is a time that is close to the beginning of the simulated adaptive experiment. As shown in FIG. 4A, two simulated users U1 and U2 are assigned to the "A" variant, two users U3 and U4 are assigned to the "B" variant, and two users U5 and U6 are assigned to the "C" variant. In other embodiments, the variant assignment module 121 may use other types of assignment schemes to initially assign simulated users to variants included in the simulated adaptive experiment.

After the assignment of a simulated user to a variant, the simulation module 111 simulates the simulated user's interactions with the variant. The simulation module 111 simulates the simulated user's interactions with the variant based on the assumed performance of the variant and the experiment parameters of the simulated adaptive experiment. The simulation module 111 may also consider the historical user data 307 during the simulation of the user interactions. In one or more embodiments, the simulated interactions include whether the simulated users performed an action related to the performance metric being measured by the simulation module 111. In the web page example of FIGS. 2A to 2C, the simulation module 111 simulates whether a conversion occurs on the provided variant of the web page.

In one embodiment, the simulation module 111 determines whether a simulated user performed an action related to the performance metric being measured (e.g., performed a conversion) using a data generation process (DPG) that generates simulated data. For example, in the case of a binary performance metric being measured such as conversion, each variant's conversion rate is modeled as a Bernoulli distribution. The Bernoulli distribution may have a probability of conversion p where p (treatment) may be p (control)×1.12. To determine whether a simulated user performed the desired action (e.g., a conversion), the simulation module 111 draws a sample from the Bernoulli distribution.

FIG. 4B illustrates a detailed view of the simulated adaptive experiment at a time T2 that is after time T1 shown in FIG. 4A. As mentioned above, in adaptive experiments, the number of assignments to the different variants varies based on observed performance of the variants during the adaptive experiment. In the example shown in FIG. 4B, the simulation module 111 has continued to assign simulated users to the "B" variant and the "C" variant based on the observed performance of the variants during the simulated adaptive experiment. However, the simulation module 111 has concluded that the "A" variant "fails" the simulated adaptive experiment due to poor performance. As mentioned above, whether a variant is a "success" is based on the definition of success for that particular experiment. In the example shown in FIGS. 4A to 4C, success is based on a MDE of 10% improvement over the control.

The "A" variant failed the simulated adaptive experiment as the simulation module 111 determined based on the observed performance that the "A" variant is unlikely to ever reach the MDE of the simulated adaptive experiment. Thus, the simulation module 111 down weights (e.g., decreases) the variant weight for the "A" variant such that the variant assignment module 121 no longer assigns simulated users to the "A" variant and upweights (increases) the variant weights for the "B" and "C" variants. As a result of the upweighting of the variant weights for the "B" and "C" variants, the variant assignment module 121 continues to assign simulated users to the "B" and "C" variants according to their variant weights. Since the simulation module 111 down weights the "A" variant, the conclusion of the simulated adaptive experiment is reached earlier than if the simulation module 111 continued to assign simulated users to the "A" variant.

In FIG. 4B, the "C" variant has the best observed performance at time T2 of the simulated adaptive experiment. Thus, the variant assignment module 121 assigns more simulated users to the "C" variant than the "B" variant, but still continues to assign simulated users to the "B" variant. At time T2, six simulated users (simulated users U5, U6, U8, U9, U10, and U11) are assigned to the "C" variant whereas three simulated users (simulated users U3, U4, and U7) are assigned to the "B" variant.

FIG. 4C illustrates a detailed view of the simulated adaptive experiment at a time T3 that is after time T2 shown in FIG. 4B according to one or more embodiments. In the example, shown in FIG. 4C, the simulation module 111 has continued to assign simulated users to the "B" variant and the "C" variant based on the observed performance of the variants during the simulated adaptive experiment. However, the simulation module 111 has concluded at time T3 that the "C" variant is a "success" based on the observed performance of the "C" variant during the simulated adaptive experiment.

In one or more embodiments, the simulation module 111 stops assigning simulated users to a successful variant and upweights any remaining variants that have a probability of being successful. In the example in FIG. 4C, the simulation module 111 no longer assigns simulated users to the "C" variant and upweights the variant weight of the "B" variant such that all remaining simulated users are assigned to the "B" variant.

FIG. 4D illustrates a detailed view of the simulated adaptive experiment at a time T4 that is after time T3 shown in FIG. 4C according to one or more embodiments. In the example shown in FIG. 4D, the simulation module 111 reached the conclusion of the simulated adaptive experiment at time T4. The simulation module 111 ended the simulated adaptive experience after determining that the "B" variant (e.g., the last remaining variant) is successful based on the observed performance of the "B" variant responsive to continuing to assign simulated users to the "B" variant. In one or more embodiments, the simulation module 111 may repeat one or more additional simulations of the simulated adaptive experiment based on the received definition of the simulated adaptive experiment.

In one or more embodiments, the simulation module 111 determines the simulation results for each simulation as well as a collective simulation result for all of the simulations of the adaptive experiment. As mentioned above, the simulation module 111 may repeatedly perform simulations of the adaptive experiment. Thus, the simulation results may include a time range having a lower bound and an upper bound of an estimated amount of time to conclude a real-world adaptive experiment having the same parameters as the simulated adaptive experiment based on the simulation results for all of the simulations of the adaptive experiment. The collective simulation results may also include a range having an upper bound and a lower bound of an estimated number of users (e.g., observations) that are required to reach the end of the real-world adaptive experiment based on the number of simulated users that were required to reach the conclusion of the simulated adaptive experiment. The simulation module 111 may store the simulation results in the experiment record for the simulated adaptive experiment in the experiment database 119.

Referring back to FIG. 1, the UI module 115 generates a graphical user interface that includes the simulation results. The visual representation of the simulation results allow an experimenter to design a real-world adaptive experiment based on the simulation results. For example, the experimenter may have a fixed duration of time in which to conduct a real-world adaptive experiment. Previously, the experimenter would be unable to determine how many variants to include in the real-word adaptive experiment and/or whether the real-world adaptive experiment would even conclude during the time constraint in which the real-world adaptive experiment must be completed. However, the experimenter can now design a real-world adaptive experiment that maximizes the number of variants to include in the real-world adaptive experiment given real-world time constraints based on the simulation results.

FIG. 5 is an example histogram 500 of collective simulation results generated by the UI module 115 according to one or more embodiments. The histogram 500 is of simulation results of the plurality of simulated adaptive experiments including the "A," "B," and "C" variants described with respect to FIGS. 3 to 4D for example. The histogram 500 includes simulation results for different variant distributions of the "A," "B," and "C" variants. The histogram 500 includes variant distributions A to N where each variant distribution may have different assumed performances for the variants included in the simulated adaptive experiment. Thus, the histogram 500 shows the range of estimated completion times and number of observations required for each distribution in a real-world adaptive experiment. Based on the example histogram 500, the experimenter can design a real-world adaptive experiment that maximizes the number of variants to include in the real-world adaptive experiment given real-world time constraints.

Real-World Adaptive Experiment

Referring back to FIG. 1, the experiment system 101 includes an experiment module 113. In contrast to the simulation module 111, the experiment module 113 conducts real-world adaptive experiments rather than simulated adaptive experiments. The real-world adaptive experiments may include definitions of the real-world adaptive experiments that are based on the simulation results of simulated adaptive experiments performed by the simulation module 111. As shown in FIG. 1, the experiment module 113 includes a variant assignment module 123 in one or more embodiments.

The variation selection module 123 may receive client device requests for objects from the web server 105. For each received request, the variation selection module 123 determines whether the user associated with the request is subject to the experiment and if so, selects a variant for assignment to the user. Similar to the variant assignment module 121 included in the simulation module 111, the variant assignment module 123 may randomly assign real-world users to variants included in an adaptive experiment. The assignment may initially result in an even distribution of users to the different variants included in the adaptive environment.

Once the variation selection module 123 determines which variant of the object should be provided to the client device 102, the variation selection module 123 transmits a notification to the web server 105. The notification instructs the web server 105 to provide a particular variant of the object to the client device 102 that requested the object. In one or more embodiments, the variation selection module 123 may also store in the experiment database which variant was assigned to each user to track the history of assignments.

In one or more embodiments, the result module 125 tracks data describing user interactions of objects by users of client devices 102. Interactions include conversions that occur on each of the different variants. The result module 125 determines from the data the results of the experiment of the object based on the interactions. The interactions are indicative of a performance metric for each variant included in the real-world experiment. For example, the result module 125 determines based on the interaction data that a higher percentage of conversions (e.g., a performance metric) occurred in the "C" variant compared to "A" variant and "B" variant. Thus, based on the results of the real-world experiment, the experiment system 101 may promote variant C of the object as the control version of the object thereby replacing the original control version of the web page.

Generally, the real-word experiment is ended when it has been conducted for a long enough period of time such that a large enough sample size is acquired to achieve a predetermined level of statistical power. In one or more embodiments, the result module 125 may determine the results of the experiment based on various criteria. For example, the result module 125 may determine the results after a threshold amount of time has passed since the real-world experiment was started (e.g., 3 months). In another example, the result module 125 may determine the results after a threshold number of users were exposed to the experiment (e.g., 1000 users). In yet another example, the result module 125 may determine the results when one or more metrics of interest show a statistically significant improvement and counter metrics show no degradation. The result module 125 may also end an experiment at any time due to operational or business concerns. However, any types of criteria may be used to end an experiment.

In one or more embodiments, the simulation module 111 may be updated based on the results of the real-world adaptive experiment. The results of the real-world adaptive experiment may be compared to the simulation results of the simulated adaptive experiment upon which the real-world adaptive experiment was designed. The experiments system 101 may determine whether the simulation results of multiple different simulated adaptive experiment were within a threshold accuracy (e.g., 90%) of the results of the corresponding real-world adaptive experiments. Responsive to the threshold accuracy being reached, the simulation module 111 is determined accurate and no changes to the simulation module 111 may be required. However, if the threshold accuracy is not met, the simulation module 111 may be updated to improve the accuracy of the simulation module 111. In one or more embodiments, the performance of the simulation module 111 may be validated against real-world results periodically based on time or after a threshold number of simulations are performed.

Method of Conducting Simulations of an Adaptive Experiment

Figure 6:
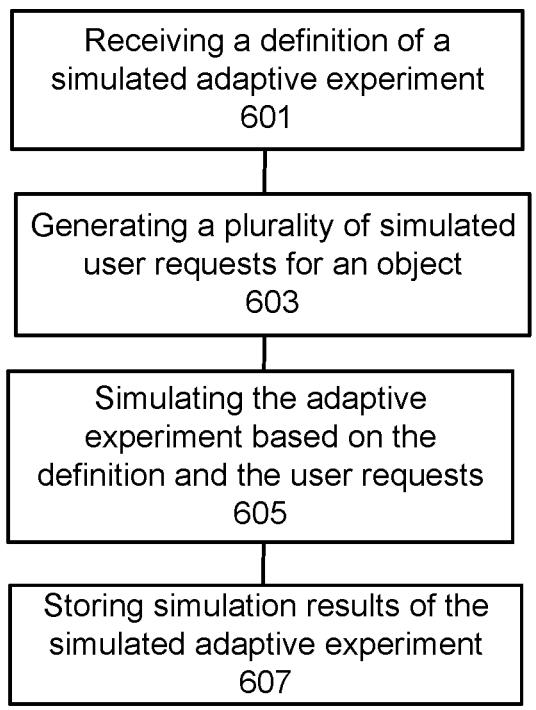
FIG. 6 is a method flow diagram for simulating an adaptive experiment according to one or more embodiments.

FIG. 6 illustrates one or more embodiments of a method of the experiment system 101 to simulate an adaptive experiment. The experiment system 101 receives 601 a definition of a simulated adaptive experiment. In one or more embodiments, the definition includes a list of a plurality of variants of an object for inclusion in the simulated adaptive experiment and a distribution of assumed performances of the plurality of variants. The experiment system 101 generates 603 a plurality of simulated user requests for the object. The simulated user requests are requests from simulated users.

The experiment system 101 simulates 605 the adaptive experiment based on the distribution of the assumed performances of the plurality of variants and the plurality of simulated user requests for the object. The simulation includes assigning each of the plurality of simulated users to one of the plurality of variants based on the definition of the adaptive experiment and simulating an interaction of each of the plurality of simulated users with the variant assigned to the simulated user based on an assumed performance of the assigned variant. The experiment system 101 concludes the simulated adaptive experiment responsive to determining whether each of the variants included in the simulated adaptive experiment passes or fails the simulated adaptive experiment.

The experiment system 101 stores 607 simulation results of the simulated adaptive experiment based on the conclusion of the simulated adaptive experiment. The simulation results may include an estimated amount of time to complete a real-world adaptive experiment that corresponds to the simulated adaptive experiment.

Hardware Components

Figure 7:
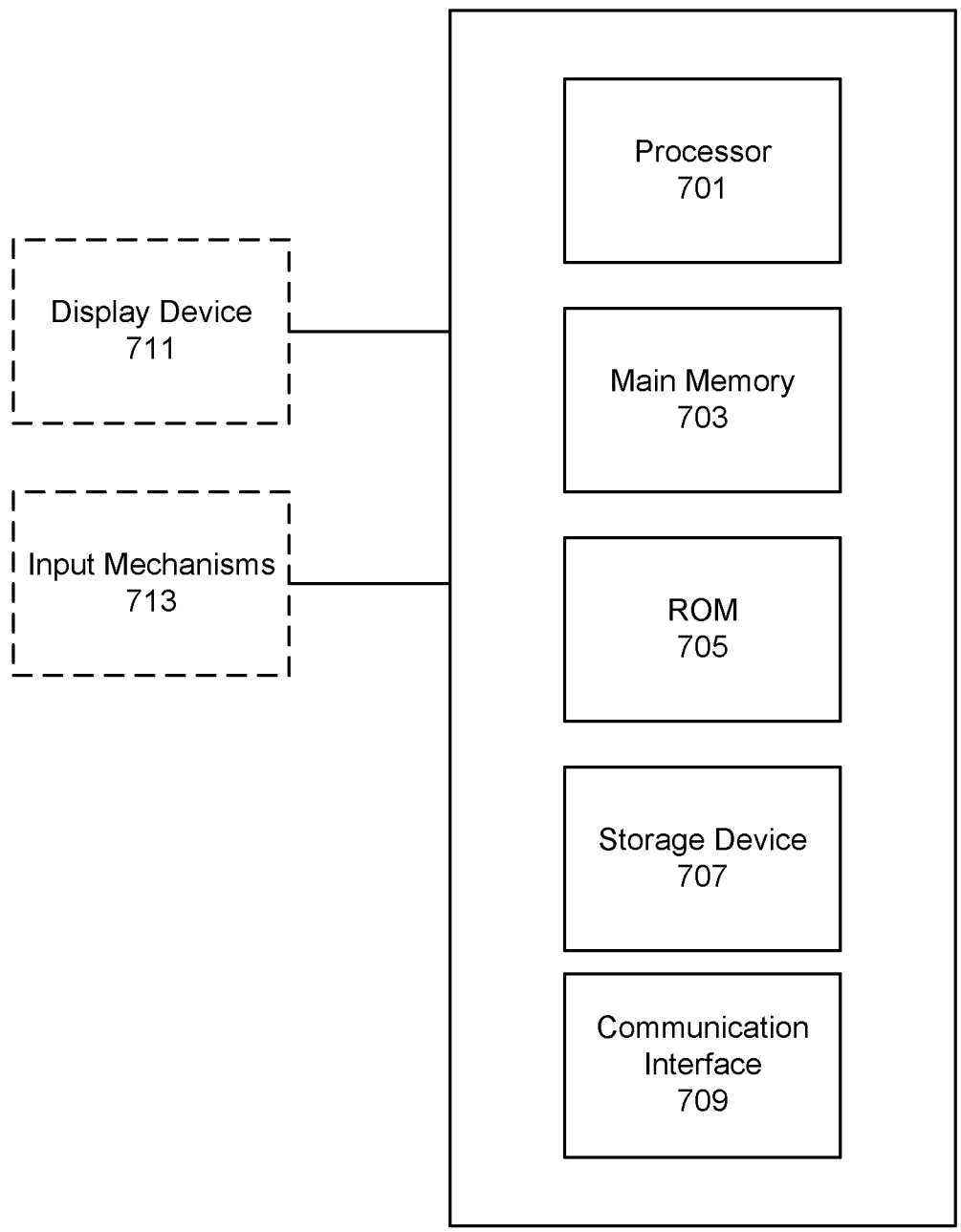
FIG. 7 is system diagram of a computer system, according to one or more embodiments The figures depict an embodiment for purposes of illustration only. Alternative embodiments of the structures and methods illustrated herein may be employed without departing from the principles described herein.

FIG. 7 is a diagram illustrating a computer system 700 upon which embodiments described herein may be implemented within the experiment system 101 and client devices 102. For example, in the context of FIG. 1, the experiment system 101 and client devices 102 may each be implemented using a computer system such as described by FIG. 7. The experiment system 101 and/or client devices 102 may also be implemented using a combination of multiple computer systems as described by FIG. 7.

In one implementation, experiment system 101 and/or client devices 102 each include processing resources 701, main memory 703, read only memory (ROM) 705, storage device 707, and a communication interface 709. The experiment system 101 and/or client devices 102 include at least one processor 701 for processing information and a main memory 703, such as a random access memory (RAM) or other dynamic storage device, for storing information and instructions to be executed by the processor 701. In one or more embodiments, multiple processors are employed by the experiment system 101 and/or client devices 102 to perform the techniques described above in order to improve efficiency of the experiment system 101 and/or client devices 102 and reduce computation time when conducting simulations of adaptive experiments. Main memory 703 also may be used for storing temporary variables or other intermediate information during execution of instructions to be executed by processor 701. Experiment system 101 and/or client devices 102 may each also include ROM 705 or other static storage device for storing static information and instructions for processor 701. The storage device 707, such as a magnetic disk or optical disk or solid state memory device, is provided for storing information and instructions.

The communication interface 709 can enable each of the experiment system 101 and/or client devices 102 to communicate with each other through use of a communication link (wireless or wireline). Each of the experiment system 101 and/or client devices 102 can optionally include a display device 711, such as a cathode ray tube (CRT), an LCD monitor, an LED monitor, OLED monitor, a TFT display or a television set, for example, for displaying graphics and information to a user. An input mechanism 713, such as a keyboard that includes alphanumeric keys and other keys, can optionally be coupled to the experiment system 101 for communicating information and command selections to processor 701. Other non-limiting, illustrative examples of input mechanisms 713 include a mouse, a trackball, touch-sensitive screen, or cursor direction keys for communicating direction information and command selections to processor 701 and for controlling cursor movement on display device 711.

Examples described herein are related to the use of the experiment system 101 and/or client devices 102 for implementing the techniques described herein. According to one or more embodiments, those techniques are performed by each of the experiment system 101 and/or client devices 102 in response to processor 701 executing one or more sequences of one or more instructions contained in main memory 703. Such instructions may be read into main memory 703 from another machine-readable medium, such as storage device 707. Execution of the sequences of instructions contained in main memory 703 causes processor 701 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one or more embodiments" or to "an embodiment" means that a particular feature, structure, or characteristic is included in at least one or more embodiments of the disclosure. The appearances of the phrase "in one or more embodiments" in various places in the specification are not necessarily referring to the same embodiment.

Some portions of the above are presented in terms of methods and symbolic representations of operations on data bits within a computer memory. These descriptions and representations are the means used to most effectively convey the substance of work to others. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various computing systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a one or more embodiments and several alternate embodiments, various changes in form and details can be made therein without departing from the spirit and scope of the invention.

What is claimed is:

1. A computer-implemented method of simulating an adaptive experiment, the computer-implemented method comprising:
   receiving, by a simulator of an experiment system, a definition of a simulated adaptive experiment, the definition including a list of a plurality of variants of an object for inclusion in the simulated adaptive experiment and a distribution of assumed performances of the plurality of variants;
   generating, by the simulator, a plurality of simulated user requests for the object from a plurality of simulated users;
   simulating, by the simulator, an adaptive experiment based on the distribution of the assumed performances of the plurality of variants and the plurality of simulated user requests for the object, wherein simulating the adaptive experiment comprises:
      assigning each of the plurality of simulated users to one of the plurality of variants based on the definition of the adaptive experiment;
      simulating an interaction of each of the plurality of simulated users with the variant assigned to the simulated user based on an assumed performance of the assigned variant from the distribution of assumed performances; and
      concluding the simulated adaptive experiment; and
   storing, by the simulator, simulation results of the simulated adaptive experiment based on the simulated adaptive experiment, the simulation results including an estimated amount of time to complete a real-world adaptive experiment that corresponds to the simulated adaptive experiment.

2. The computer-implemented method of claim 1, wherein the definition further includes a minimum detectable effect (MDE) of a performance metric.

3. The computer-implemented method of claim 2, wherein the simulated adaptive experiment is concluded responsive to the simulator determining for each of the plurality of variants whether a simulated performance of the variant is capable of at least matching the MDE.

4. The computer-implemented method of claim 2, wherein the definition further includes a plurality of different distributions of assumed performances of the plurality of variants.

5. The computer-implemented method of claim 4, wherein simulating the adaptive experiment comprises:
   conducting, by the simulator, one or more simulations of the adaptive experiment for each of the plurality of different distributions of assumed performances of the plurality of variants.

6. The computer-implemented method of claim 5, wherein the simulation results include a distribution of a range of estimated amount of times to complete a real-world adaptive experiment that corresponds to the plurality of different distributions of assumed performances of the plurality of variants.

7. The computer-implemented method of claim 1, wherein the simulation results further include an estimated number of real-world users that are required to complete the real-world adaptive experiment that corresponds to the simulated adaptive experiment.

8. The computer-implemented method of claim 2, further comprising:
receiving, by the experiment system, a definition of the real-world adaptive experiment, the definition including a list of one or more variants from the plurality of variants of the object that were also included in the simulated adaptive experiment and a distribution of assumed performances of the one or more variants, the one or more variants included in the real-world adaptive experiment based on the simulation results;
receiving, by the experiment system, a plurality of requests for the object from a plurality of client devices;
assigning, by the experiment system, a variant from the one or more variants of the object to each client device from the plurality of client devices that submitted the request;
transmitting, by the experiment system, the assigned variant of the object to each of the plurality of client devices;
monitoring, by the experiment system, interactions with the plurality of variants by the plurality of different client devices;
determining, by the experiment system, performances of the plurality of variants with respect to the effect being measured; and
concluding, by the experiment system, the real-world experiment based on the performances of the plurality of different variants.

9. The computer-implemented method of claim 8, wherein the simulator is updated based on the conclusion of the real-world experiment.

10. The computer-implemented method of claim 1, wherein the adaptive experiment is simulated using a Monte Carlo simulation.

11. A computer program product comprising a non-transitory computer-readable storage medium storing executable code for simulating an adaptive experiment, the code when executed causing a computer of an experiment system to perform steps comprising:
receiving, by a simulator of the experiment system, a definition of a simulated adaptive experiment, the definition including a list of a plurality of variants of an object for inclusion in the simulated adaptive experiment and a distribution of assumed performances of the plurality of variants;
generating, by the simulator, a plurality of simulated user requests for the object from a plurality of simulated users;
simulating, by the simulator, an adaptive experiment based on the distribution of the assumed performances of the plurality of variants and the plurality of simulated user requests for the object, wherein simulating the adaptive experiment comprises:
assigning each of the plurality of simulated users to one of the plurality of variants based on the definition of the adaptive experiment;
simulating an interaction of each of the plurality of simulated users with the variant assigned to the simulated user based on an assumed performance of the assigned variant from the distribution of assumed performances; and
concluding the simulated adaptive experiment; and
storing, by the simulator, simulation results of the simulated adaptive experiment based on the simulated adaptive experiment, the simulation results including an estimated amount of time to complete a real-world adaptive experiment that corresponds to the simulated adaptive experiment.

12. The computer program product of claim 11, wherein the definition further includes a minimum detectable effect (MDE) of a performance metric.

13. The computer program product of claim 12, wherein the simulated adaptive experiment is concluded responsive to the simulator determining for each of the plurality of variants whether a simulated performance of the variant is capable of at least matching the MDE.

14. The computer program product of claim 12, wherein the definition further includes a plurality of different distributions of assumed performances of the plurality of variants.

15. The computer program product of claim 14, wherein simulating the adaptive experiment comprises:
conducting, by the simulator, one or more simulations of the adaptive experiment for each of the plurality of different distributions of assumed performances of the plurality of variants.

16. The computer program product of claim 15, wherein the simulation results include a distribution of a range of estimated amount of times to complete a real-world adaptive experiment that corresponds to the plurality of different distributions of assumed performances of the plurality of variants.

17. The computer program product of claim 12, the code when executed further causing the computer to perform steps comprising:
receiving, by the experiment system, a definition of the real-world adaptive experiment, the definition including a list of one or more variants from the plurality of variants of the object that were also included in the simulated adaptive experiment and a distribution of assumed performances of the one or more variants, the one or more variants included in the real-world adaptive experiment based on the simulation results;
receiving, by the experiment system, a plurality of requests for the object from a plurality of client devices;
assigning, by the experiment system, a variant from the one or more variants of the object to each client device from the plurality of client devices that submitted the request;
transmitting, by the experiment system, the assigned variant of the object to each of the plurality of client devices;
monitoring, by the experiment system, interactions with the plurality of variants by the plurality of different client devices;
determining, by the experiment system, performances of the plurality of variants with respect to the effect being measured; and
concluding, by the experiment system, the real-world experiment based on the performances of the plurality of different variants.

18. The computer program product of claim 11, wherein the simulation results further include an estimated number of real-world users that are required to complete the real-world adaptive experiment that corresponds to the simulated adaptive experiment.

19. The computer program product of claim 11, wherein the adaptive experiment is simulated using a Monte Carlo simulation.

20. A computer system for, the computer system comprising:

a computer processor;

a non-transitory computer-readable storage medium storing executable code, the code when executed by the computer processor causes the computer processor to perform steps comprising:

receiving, by a simulator of the computer system, a definition of a simulated adaptive experiment, the definition including a list of a plurality of variants of an object for inclusion in the simulated adaptive experiment and a distribution of assumed performances of the plurality of variants;

generating, by the simulator, a plurality of simulated user requests for the object from a plurality of simulated users;

simulating, by the simulator, an adaptive experiment based on the distribution of the assumed performances of the plurality of variants and the plurality of simulated user requests for the object, wherein simulating the adaptive experiment comprises:

assigning each of the plurality of simulated users to one of the plurality of variants based on the definition of the adaptive experiment;

simulating an interaction of each of the plurality of simulated users with the variant assigned to the simulated user based on an assumed performance of the assigned variant from the distribution of assumed performances; and concluding the simulated adaptive experiment; and storing, by the simulator, simulation results of the simulated adaptive experiment based on the simulated adaptive experiment, the simulation results including an estimated amount of time to complete a real-world adaptive experiment that corresponds to the simulated adaptive experiment.

* * * * *